C. HOFER.
TREATMENT OF RUBBER OR RUBBER COMPOUNDS.
APPLICATION FILED MAY 2, 1917.

1,242,189.

Patented Oct. 9, 1917.

Inventor
CONRAD HOFER
By Watson E. Coleman
Attorney

UNITED STATES PATENT OFFICE.

CONRAD HOFER, OF TRENTON, NEW JERSEY.

TREATMENT OF RUBBER OR RUBBER COMPOUNDS.

1,242,189. Specification of Letters Patent. Patented Oct. 9, 1917.

Application filed May 2, 1917. Serial No. 165,983.

*To all whom it may concern:*

Be it known that I, CONRAD HOFER, citizen of the United States, residing at Trenton, in the county of Mercer and State of New Jersey, have invented certain new and useful Improvements in Treatment of Rubber or Rubber Compounds, of which the following is a specification, reference being had to the accompanying drawings.

This invention relates to certain improvements in the treatment of rubber or rubber compounds, and it is an object of the invention to produce a novel improved sheet or lamination of rubber whereby a face thereof is roughened and wherein the roughened face of the sheet or lamination is homogeneous with the sheet or layer proper.

It is also an object of the invention to provide a novel and improved sheet or lamination of rubber or the like wherein a surface or face of said sheet or lamination is roughened by a contraction or shrinkage of said face.

The novel features of the invention will hereinafter be definitely claimed.

In order that my invention may be the better understood, I will now proceed to describe the same with reference to the accompanying drawings, wherein—

Figure 1:
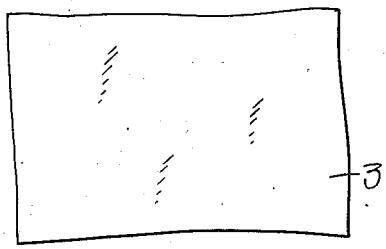
Figure 2:
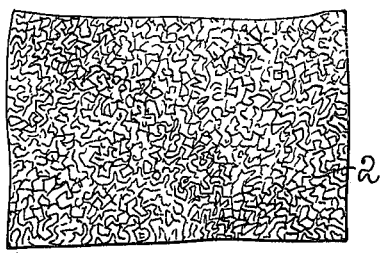
Figure 3:
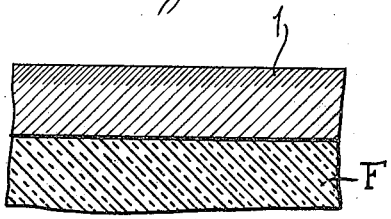
Figure 4:
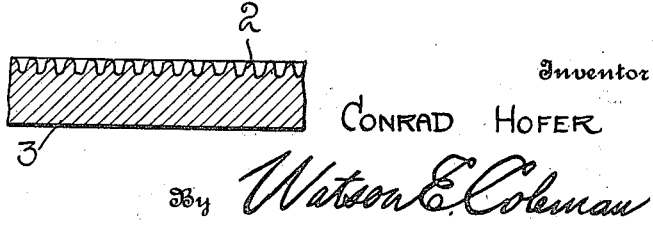

Figure 1 is a fragmentary view in plan of a face of the rubber sheet or lamination treated in accordance with an embodiment of my invention, Fig. 2 is a fragmentary view in plan of the opposite side of the rubber sheet or lamination as herein included;

Fig. 3 is an enlarged, fragmentary sectional view, taken through the rubber sheet or lamination after being subjected to a fume cure, as comprised in my improved treatment, and wherein a surface or face of the sheet or lamination is glazed; and Fig. 4 is an enlarged, fragmentary sectional view, taken through a completed rubber sheet or lamination produced in accordance with an embodiment of my invention.

In producing my improved rubber sheet or lamination, a form having a glazed surface is dipped within the rubber compound or cement, said compound or cement preferably having substantially the consistency of molasses and which includes a desired amount of sulfur, together with a desired amount of benzin or other high grade volatile hydrocarbon.

The dipping of the form F within the compound or cement is repeated until the desired thickness of the sheet or lamination is acquired, whereupon the sheet or lamination upon the form is allowed to stand until it is thoroughly dry. The form with the sheet or lamination thereon is then placed within any ordinary or preferred type of sulfur cure chest and subjected for a period of from one half minute to one and one-half minutes to the fumes of sulfur combined with an element of the halogen group, preferably created by the evaporation of sulfur chlorid at a temperature of about 120° F. The fume cure upon the sheet or lamination results in the exposed or outer face or surface thereof becoming glazed, as indicated at 1 in Fig. 3 of the accompanying drawings.

After the form of the sheet or lamination has been subjected to the fume cure it is then placed within a vulcanizer of any desired type, to be steam cured. The action of the steam during this step of the process results in the outer or exposed face or surface of the sheet or lamination contracting or puckering, as indicated at 2 in Figs. 2 and 4 of the accompanying drawings. It has been fully demonstrated in practice that the contraction or pucker of this exposed or outer face is confined wholly to the glazed face or surface of the sheet or lamination. Under ordinary conditions the sheet or lamination is confined within the vulcanizer for substantially one hour and thirty minutes with the steam at a pressure of around forty pounds, although I do not wish to be understood as limiting myself in this respect.

After the form to which the sheet or lamination of rubber has been applied is withdrawn from within the vulcanizer, the sheet or lamination is peeled from said form, and the face or surface of the sheet or lamination which has been in direct contact with the form is smooth and unobstructed, as indicated at 3 in Figs. 1 and 4.

A sheet or fabric produced in accordance with my invention is particularly adapted for use in the production of toilet articles such as massage strips or cloths, bathing gloves and other accessories of the bath. It has also been found that a household glove produced from rubber treated in accordance with my invention is of advantage, as the roughened outer surface will facilitate the gripping action.

From the foregoing description it is thought to be obvious that the method of treating rubber or rubber compound in accordance with my invention is of an extremely simple and comparatively inexpensive nature, and it will also be obvious that it is particularly well adapted for use by reason of the roughened surface formed upon a face of the sheet or lamination.

I claim:

1. A method of treating rubber, consisting in dipping a form in a rubber cement, then curing the rubber upon the form by sulfur chlorid fumes, then subjecting the rubber on the form to a steam cure, and then removing the rubber from the form.

2. A method of treating rubber, consisting in dipping a form in a rubber cement including a volatile hydrocarbon and sulfur, permitting the rubber collected by the form to dry, then curing said rubber on the form by sulfur chlorid fumes, then subjecting the rubber on the form to a steam cure, and then removing the rubber from the form.

3. A method of treating rubber, consisting in glazing a surface of the rubber and then contracting the glazed face.

4. A method of treating rubber consisting in glazing a face of the rubber and then subjecting the glazed face to a steam cure.

5. A method of treating rubber consisting in curing the rubber by sulfur chlorid fumes and then subjecting the rubber to a steam cure.

In testimony whereof I hereunto affix my signature in the presence of two witnesses.

CONRAD HOFER.

Witnesses:
 MAY HIXSON,
 JOHN HOFER.